United States Patent [19]
Geshwind

[11] Patent Number: 6,025,882
[45] Date of Patent: Feb. 15, 2000

[54] METHODS AND DEVICES FOR INCORPORATING ADDITIONAL INFORMATION SUCH AS HDTV SIDE STRIPS INTO THE BLANKING INTERVALS OF A PREVIOUS FRAME

[76] Inventor: David Michael Geshwind, 111 Fourth Ave., New York, N.Y. 10003

[21] Appl. No.: 08/485,384

[22] Filed: Jun. 7, 1995

Related U.S. Application Data

[63] Continuation-in-part of application No. 07/077,916, Jul. 27, 1987.

[51] Int. Cl.$^7$ ................................. H04N 7/08; H04N 7/01
[52] U.S. Cl. ......................... 348/435; 348/478; 348/445; 348/903; 348/904
[58] Field of Search .................................... 348/432, 435, 348/473, 476, 478, 445, 448, 458, 43, 51, 903, 904, 426, 384, 434

[56] References Cited

U.S. PATENT DOCUMENTS

| | | | |
|---|---|---|---|
| 3,898,376 | 8/1975 | Nabeyama et al. | 348/476 |
| 4,016,361 | 4/1977 | Pandey | 348/476 |
| 4,435,761 | 3/1984 | Fleming et al. | 348/476 |
| 4,595,951 | 6/1986 | Filliman | 348/476 |
| 4,707,728 | 11/1987 | Hurst | 348/435 |
| 4,748,496 | 5/1988 | Drury et al. | 348/435 |
| 4,896,213 | 1/1990 | Kobo et al. | 348/478 |
| 4,959,717 | 9/1990 | Faroudja | 348/478 |
| 5,025,309 | 6/1991 | Isnardi | 348/433 |
| 5,061,998 | 10/1991 | Yasuki et al. | 348/476 |
| 5,068,729 | 11/1991 | Katznelson et al. | 348/435 |
| 5,097,332 | 3/1992 | Faroudja | 348/476 |
| 5,262,860 | 11/1993 | Fitzpatrick | 348/476 |
| 5,430,486 | 7/1995 | Fraser et al. | 348/435 |
| 5,537,151 | 7/1996 | Orr et al. | 348/468 |

*Primary Examiner*—Victor R. Kostak

[57] ABSTRACT

Methods and devices for incorporating additional information, such as HDTV side strips, into the blanking intervals of a previous frame. These may be used in conjunction with Inventor's time-varying STS techniques or otherwise. The information thus incorporated may be used, in addition to HDTV side strips, for the incorporation of data that may represent: additional definition; information that may be used to convert a monoscopic image into a left and right pair, or the second of a pair; various area maps which may be used to apply a multiplicity of algorithms to separate areas of an image; motion analysis information; interactive or gaming information; multimedia or hypermedia information; or, otherwise. Off-line computation and recording may be used to advantage at the encoding end of the process, as well as pipelined architecture at the reception end.

34 Claims, 10 Drawing Sheets

ENCODING OF HDTV "SIDE STRIPS" INTO NTSC BLANKING INTERVALS
WHICH MAY BE OF A PREVIOUS FRAME

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 2

SOURCE

| A 11 | B 11 | A 12 | B 12 | A 13 | B 13 |
|---|---|---|---|---|---|
| D 11 | C 11 | D 12 | C 12 | D 13 | C 13 |
| A 21 | B 21 | A 22 | B 22 | A 23 | B 23 |
| D 21 | C 21 | D 22 | C 22 | D 23 | C 23 |
| A 31 | B 31 | A 32 | B 32 | A 33 | B 33 |
| D 31 | C 31 | D 32 | C 32 | D 33 | C 33 |

DESTINATION

| X 11 | X 11 | X 12 | X 12 | X 13 | X 13 |
|---|---|---|---|---|---|
| X 11 | X 11 | X 12 | X 12 | X 13 | X 13 |
| X 21 | X 21 | X 22 | X 22 | X 23 | X 23 |
| X 21 | X 21 | X 22 | X 22 | X 23 | X 23 |
| X 31 | X 31 | X 32 | X 32 | X 33 | X 33 |
| X 31 | X 31 | X 32 | X 32 | X 33 | X 33 |

FIGURE 3

SOURCE

| A*<br>11 | B<br>11 | A*<br>12 | B<br>12 | A*<br>13 | B<br>13 |
|---|---|---|---|---|---|
| D<br>11 | C<br>11 | D<br>12 | C<br>12 | D<br>13 | C<br>13 |
| A*<br>21 | B<br>21 | A*<br>22 | B<br>22 | A*<br>23 | B<br>23 |
| D<br>21 | C<br>21 | D<br>22 | C<br>22 | D<br>23 | C<br>23 |
| A*<br>31 | B<br>31 | A*<br>32 | B<br>32 | A*<br>33 | B<br>33 |
| D<br>31 | C<br>31 | D<br>32 | C<br>32 | D<br>33 | C<br>33 |

DESTINATION

| A<br>11 | A<br>11 | A<br>12 | A<br>12 | A<br>13 | A<br>13 |
|---|---|---|---|---|---|
| A<br>11 | A<br>11 | A<br>12 | A<br>12 | A<br>13 | A<br>13 |
| A<br>21 | A<br>21 | A<br>22 | A<br>22 | A<br>23 | A<br>23 |
| A<br>21 | A<br>21 | A<br>22 | A<br>22 | A<br>23 | A<br>23 |
| A<br>31 | A<br>31 | A<br>32 | A<br>32 | A<br>33 | A<br>33 |
| A<br>31 | A<br>31 | A<br>32 | A<br>32 | A<br>33 | A<br>33 |

FIGURE 4A

SOURCE

| A 11 | B* 11 | A 12 | B* 12 | A 13 | B* 13 |
|---|---|---|---|---|---|
| D 11 | C 11 | D 12 | C 12 | D 13 | C 13 |
| A 21 | B* 21 | A 22 | B* 22 | A 23 | B* 23 |
| D 21 | C 21 | D 22 | C 22 | D 23 | C 23 |
| A 31 | B* 31 | A 32 | B* 32 | A 33 | B* 33 |
| D 31 | C 31 | D 32 | C 32 | D 33 | C 33 |

DESTINATION

| B 11 | B 11 | B 12 | B 12 | B 13 | B 13 |
|---|---|---|---|---|---|
| B 11 | B 11 | B 12 | B 12 | B 13 | B 13 |
| B 21 | B 21 | B 22 | B 22 | B 23 | B 23 |
| B 21 | B 21 | B 22 | B 22 | B 23 | B 23 |
| B 31 | B 31 | B 32 | B 32 | B 33 | B 33 |
| B 31 | B 31 | B 32 | B 32 | B 33 | B 33 |

FIGURE 4B

SOURCE

| A 11 | B 11 | A 12 | B 12 | A 13 | B 13 |
|---|---|---|---|---|---|
| D 11 | C* 11 | D 12 | C* 12 | D 13 | C* 13 |
| A 21 | B 21 | A 22 | B 22 | A 23 | B 23 |
| D 21 | C* 21 | D 22 | C* 22 | D 23 | C* 23 |
| A 31 | B 31 | A 32 | B 32 | A 33 | B 33 |
| D 31 | C* 31 | D 32 | C* 32 | D 33 | C* 33 |

DESTINATION

| C 11 | C 11 | C 12 | C 12 | C 13 | C 13 |
|---|---|---|---|---|---|
| C 11 | C 11 | C 12 | C 12 | C 13 | C 13 |
| C 21 | C 21 | C 22 | C 22 | C 23 | C 23 |
| C 21 | C 21 | C 22 | C 22 | C 23 | C 23 |
| C 31 | C 31 | C 32 | C 32 | C 33 | C 33 |
| C 31 | C 31 | C 32 | C 32 | C 33 | C 33 |

FIGURE 4C

SOURCE

| A 11 | B 11 | A 12 | B 12 | A 13 | B 13 |
|---|---|---|---|---|---|
| D* 11 | C 11 | D* 12 | C 12 | D* 13 | C 13 |
| A 21 | B 21 | A 22 | B 22 | A 23 | B 23 |
| D* 21 | C 21 | D* 22 | C 22 | D* 23 | C 23 |
| A 31 | B 31 | A 32 | B 32 | A 33 | B 33 |
| D* 31 | C 31 | D* 32 | C 32 | D* 33 | C 33 |

DESTINATION

| D 11 | D 11 | D 12 | D 12 | D 13 | D 13 |
|---|---|---|---|---|---|
| D 11 | D 11 | D 12 | D 12 | D 13 | D 13 |
| D 21 | D 21 | D 22 | D 22 | D 23 | D 23 |
| D 21 | D 21 | D 22 | D 22 | D 23 | D 23 |
| D 31 | D 31 | D 32 | D 32 | D 33 | D 33 |
| D 31 | D 31 | D 32 | D 32 | D 33 | D 33 |

FIGURE 4D

ENCODING OF HDTV "SIDE STRIPS" INTO NTSC BLANKING INTERVALS
WHICH MAY BE OF A PREVIOUS FRAME

DECODING OF HDTV "SIDE STRIPS" FROM NTSC BLANKING INTERVALS
WHICH MAY BE OF PREVIOUS FRAME

OFF-LINE RECORDING AND REAL-TIME PLAYBACK/DELIVERY

METHODS AND DEVICES FOR INCORPORATING ADDITIONAL INFORMATION SUCH AS HDTV SIDE STRIPS INTO THE BLANKING INTERVALS OF A PREVIOUS FRAME

CROSS-REFERENCES TO RELATED APPLICATIONS

This application is a continuation-in-part of applicant's application 07/077,916 filed Jul. 27, 1987.

That prior application is also a continuation-in-part of applicant's application 08/110,230 filed Aug. 23, 1993 which is a continuation-in-part of 07/435,487 (filed Aug. 17, 1989, now abandoned), which was both: a continuation-in-part of application 07/227,403 filed Dec. 17, 1986 (issued May 15, 1990 as U.S. Pat. No. 4,925,294); and, a continuation-in-part of application 07/006,291 filed Jan. 20, 1987 (issued Sep. 24, 1991 as U.S. Pat. No. 5,050,894) which was a continuation of 06/601,091 (filed Apr. 20, 1984, now abandoned) which was a continuation-in-part of application 06/492,816 filed May 9, 1983 (issued Aug. 19, 1986 as U.S. Pat. No. 4,606,625).

That prior application is also a continuation-in-part of applicant's application 07/951,267 filed Sep. 25, 1992 which is a continuation-in-part of the above referenced application 07/435,487 and also of the above referenced application 07/077,916.

All of these documents (except for those abandoned) are hereby incorporated by reference.

SUMMARY OF THE INVENTION

The instant invention relates to a class of methods for selecting subsets of information, such as that derived by digitizing a high-definition television signal, and arranging that reduced amount of information into a second set of information which can then be, for example, converted to a low-definition signal which can then be transmitted over channels intended for low-definition signals, with minimal perceivable artifacts; as well as methods and devices for incorporating additional information, such as HDTV side strips, into the blanking intervals of a previous frame, which were developed to affect the foregoing, but which can also be independently practiced to great advantage.

BRIEF DESCRIPTION OF DRAWINGS

FIG. 2 depicts selection of a subset of a relatively high-resolution television signal for transmission over a lower bandwidth channel, where the upper left corner element (A) of each two-by-two pixel cell, is transmitted (*) for every cell, in every frame of the source image.

FIG. 3 depicts selection of a subset of a relatively high-resolution television signal for transmission over a lower bandwidth channel, where all four picture elements from each two-by-two cell in the source image are averaged, as by a low-pass digital filter, to derive the pixels of the destination display cell denoted by X, in every frame of the source image.

FIGS. 4A through 4D each depict a point sampling scheme, similar to FIG. 2; but, for each figure, a different pixel from the two-by-two cell is sampled, indicated by a (*). These four types of sampling would be alternated in a cycle of four.

FIELD OF THE INVENTION

Figure 1:
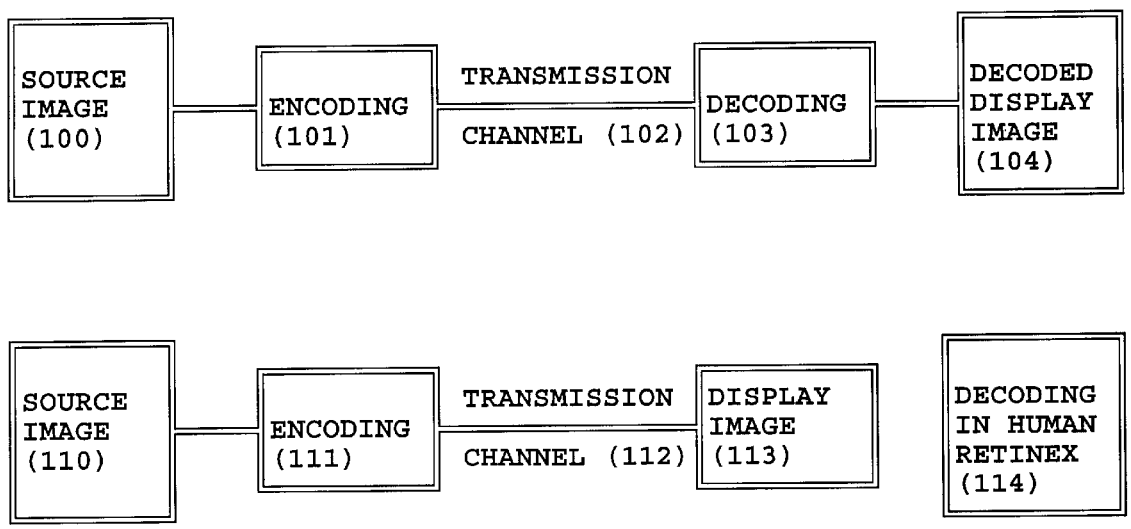
FIG. 1 depicts in the top configuration a standard encoding/decoding bandwidth reduction scheme. The bottom configuration depicts one class of embodiments where decoding occurs after display, as viewed, in the human eye/brain (retinex).

Generally, the domain where the instant invention can be applied is any process, system, device, or product made by a process, which involves a processing element whereby a first information bearing signal (often, a three-dimensional data construct consisting of a two-dimensional image plane and a third dimension of time—e.g., a television or motion picture image stream) is transformed into a second information bearing signal of similar type. Further, these signals, though of similar type, are, generally, different in some characteristic, such as resolution or definition. Examples of such areas of potential application include, without limitation, devices or processes that: encode a higher-definition television or video signal into a lower-definition television or video signal suitable for transmission, display or recording; record, transmit, decode or display such an encoded signal; transduce or transfer an image stream from an imaging element to a transmission or storage element, such as a television camera or film chain; transfer an image stream from a signal input to a recording medium, such as a videotape or videodisc recorder; transfer an image stream from a recording medium to a display element, such as a videotape or videodisc player; transfer data representing images from a computer memory element to a display element, such as a framestore or frame buffer; synthesize an image output stream from a mathematical model, such as a computer graphic rendering component; modify or combine image streams, such as image processing components, time-base correctors, signal processing components, or special effects components; products that result from the foregoing; and many other devices, processes and products that fall within the realm of motion picture and television engineering.

The invention, rather than comprising any of the foregoing, constitutes a method (e.g., a process or algorithm) for selecting and arranging information derived from the first information bearing signal, which processed information will then be used to create a second information bearing signal. Thus, the inventive matter comprises algorithms for selecting and arranging information; as well as otherwise standard devices or processes that incorporate those algorithms, and specially modified or constructed devices and processes that incorporate those algorithms. In particular, methods and devices for incorporating additional information, such as HDTV side strips, into the blanking intervals of a previous frame, were developed by Inventor to affect the foregoing, but this can also be independently practiced to great advantage.

In particular, the parent method comprises a class of techniques for doing so in a time-varying manner such that the artifacts introduced by the process or device involved become less noticeable to a human viewer than if standard techniques or algorithms are applied. It is this "greater than standard" variability over time, of the selection of information derived from the source signal and/or its arrangement into the information which will comprise the destination signal, that results in the improvement; and, in order to achieve an improvement, the variation over time must be of sufficient magnitude.

To distinguish patterns, techniques, processes or algorithms with variability sufficient to achieve a reduction in perceptual artifacts, from those which do not reduce (and may even increase) such artifacts, the words complex or complexly will be occasionally used herein to modify terms such as sampling pattern, time variation or time-varying STS (Spatial Temporal Signature, described below); and the words complex or complexity (sometimes used with variation) will be occasionally used to point out inventive techniques which can be used to achieve a sufficient magnitude of variation for effective practice.

Examples of "complex variable STS" or "complexity" when used to describe a variable STS or sampling pattern herein comprise, singly or in combination: rectangular (M×N) multi-pixel cells with a sampling scheme that decimates information significantly less than by a factor of M×N for a particular frame; multi-pixel cells that are non-rectangular; multi-pixel cells where more than a single pixel is sampled for a particular frame; pseudo-random and/or non-contiguous multi-pixel cells; distributions of multi-pixel cells of non-uniform size or shape over an image, or from frame to frame; multiplication weights for information points not equal to 1 (or a constant), or which change over a cell or frame, or from frame to frame; sampling schemes that utilize non-uniform time slices from frame to frame or over a frame; or as otherwise described herein. Thus, the word "complex", unless otherwise indicated, as used herein means intricate or sophisticated, and does not refer to numbers comprising real and imaginary parts.

BACKGROUND ART

The intended practitioner of the present invention is someone who is skilled in designing, implementing, integrating, building, creating, programming or utilizing processes, devices, systems and products, such as described in the first paragraph of this disclosure. That is, one skilled in the art required to practice the instant invention is capable of one or more of the following: design and/or construction of devices, systems, hardware and software (i.e., programming) for motion picture and television production, motion picture and television post production, signal processing, image processing, computer graphics, and the like. That is, motion picture and television engineers, computer graphic system designers and programmers, image processing system designers and programmers, digital software and hardware engineers, communication and information processing engineers, applied mathematicians, etc.

Those skilled in the art know how to accomplish such tasks as to: design and construct devices, design and integrate systems, design software for and program those devices and systems, and utilize those devices and systems to create information product, which devices and systems transfer and/or transform information derived from image streams. Such devices and systems comprise well known digital or analog electronic hardware, and software, components. The details of accomplishing such standard tasks are well known and within the ken of those skilled in these arts; are not (in and of themselves) within the scope of the instant invention; and, will be referred to but not described in detail in the instant disclosure.[1]

Rather, what will be disclosed are novel algorithms for selecting and arranging the information transferred or transformed by those systems, devices and processes; or the selection and arrangement of information comprising various information products such as magnetic or optical media containing, or transmissions of, information bearing signals; as well as methods and devices for incorporating additional information, such as HDTV side strips, into the blanking intervals of a previous frame, which may be used to affect the foregoing or independently to great advantage. Disclosed will be what one skilled in the art will need to know, beyond that with which he is already familiar, in order to implement the instant invention. These algorithms and system designs will be presented by description, algebraic formulae and graphically, indicating how information data points or "pixels" are to be selected from data derived from a first information signal, and arranged, manipulated and/or combined to create the pixels or data points that will then comprise a second information signal; as is standard and frequent practice in the field of motion picture and television engineering.[2]

These descriptions, formulae and illustrations are such as to completely and clearly specify algorithms which may be implemented in a straightforward manner by programming a programmable computer imaging device such as a frame buffer.

For example, the programmable frame buffers (some with onboard special-purpose microprocessors for graphics and/or signal processing) suitable for use with personal computers, workstations or other digital computers, along with off-the-shelf assemblers, compilers, subroutine libraries, or utilities, routinely provide as standard features, capabilities which permit a user to (among other tasks): digitize a frame of a video signal in many different formats including higher-than-television resolutions, standard television resolutions, and lower-than-television resolutions, and at 8- 16- 24- and 32-bits per pixel; display a video signal in any of those same formats; change, under program control, the resolution and/or bit-depth of the digitized or displayed frame; transfer information between any of a) visible framestore memory, b) blind (non-displayed) framestore memory, and c) host computer memory, and d) mass storage (e.g., magnetic disk) memory, on a pixel-by-pixel, line-by-line, or rectangle-by-rectangle basis.[3]

Thus, off-the-shelf devices provide the end user with the ability to: digitize high-resolution video frames; access the individual pixels of those frames; manipulate the information from those pixels under generalized host computer control and processing, to create arbitrarily processed pixels; and, display lower-resolution frames, suitable for recording, comprising those processed pixels. These off-the-shelf capabilities are sufficient to implement an image processing system embodying the information manipulation algorithms or system designs specified herein.

Similarly, higher performance and throughput (as well as higher cost and more programming effort), programmable devices, suitable for broadcast or theatrical production tasks, provide similar and much more sophisticated capabilities, including micro-coding whereby image processing algorithms can be incorporated into general purpose hardware, are available as off-the-shelf programmable systems.[4]

Additionally, specialized (graphic and image processing) programmable microprocessors are available for incorporation into digital hardware capable of providing special-purpose or general-purpose (user-programmable) image manipulation functions.[5]

Further, it is well known by those skilled in the art how to adapt processes that have been implemented as software running on programmable hardware devices, to designs for special purpose hardware, which may then provide advantages in cost vs. performance.

In summary, the disclosure of the instant invention will focus on what is new and novel and will not repeat the details of what is known in the art.

Additionally, in the disclosure, a number of specific processes, devices or systems into which the algorithms of the instant invention can be incorporated, and applications to which the algorithms of the instant invention can be applied, will be pointed out. The intended practitioner of the instant invention is already skilled in the art of: building and/or programming some one (or more) of these devices; integrating and/or programming for some one (or more) of these systems; implementing (and/or utilizing to create information product) some one (or more) of these application systems; or, designing processes and devices to manipulate information that has been modified by random noise or some specified process in order to counteract that manipulation to some degree, including encoding, decoding, reconstruction, compression and decompression.

As such, the intended practitioner has within their skill in the art the knowledge to design and create and/or use such devices, processes or systems which "push pixels around" from some first or source information bearing signal, in a specified manner, to create a second or destination information bearing signal.

Examples include, without limitation: special purpose hardware or programmable devices that permit the implementation of specific or arbitrary image processing functions (for example, image filtering, blurring, sharpening, warping, zooming, sizing, tilting, compositing, wiping, keying, matting, texture mapping, colorization$^6$, posterization, etc.); and, hardware devices that transfer or transform information, including image streams, from a source form to a destination form (encoders, decoders, cameras, recorders, players, displays, switchers, timebase correctors, noise reducers, compressors, decompressors, modulators, demodulators, etc.).

The intended practitioner is already in command of the knowledge required to design and build such devices and application systems that select, arrange and manipulate the pixels of image streams, in various previously specified manners. What is provided herein is the specification for a novel manner for selection, arrangement and manipulation of the pixels comprising such image streams. What is claimed as inventive are these algorithms and/or the incorporation of the novel algorithms into an otherwise standard device.

For example, Inventor's own film colorization system (U.S. Pat. No. 4,606,625) discloses a system comprising all the elements needed to input an image stream, process it by applying colorization and other digital filtering algorithms, and output a processed image stream. Replacing the colorization process or algorithm element of that prior invention with some one of the algorithms herein would result in a system for practicing the encoding envisioned herein on an information bearing signal derived from motion picture film or video.

Additionally, in the disclosure, it will be pointed out that a number of the parameters (e.g., the set five weights Ka, Kb, Kc, Kd and Kx for the 4+1:1 pattern) can be varied, and may be adjusted or "fine tuned". It is common practice for users of television imaging systems to adjust or "fine tune" operating parameters via physical controls or data entry. For example, with a computer image processing capability (such as those provided with computer paint systems or special effects systems—e.g., digital filters that blur, sharpen, colorize, posterize, size, stretch, warp or otherwise manipulate an image or image stream) it is common practice for a practitioner to adjust various parameters that control the processing results via numeric keyboard input, or by physical or graphic controls. Considerable time may be spent making adjustments to the process, for any particular image input to the system, to achieve the desired results. The determination of what constitutes such desired results, and when those goals have been adequately approximated are, in the motion picture and television industry, most often a matter of subjective artistic taste; what one practitioner (or, more importantly the creative director to whom he reports) may deem successful, might be entirely unacceptable to another team. The specific adjustments made, will vary from case to case and will depend upon both the characteristics of the source material and the results hoped for after processing. How the system parameters should be adjusted is often not known ahead of time. Parameters are adjusted until a desired result is achieved or approximated.

Further, some image processing systems, such as Inventor's own film colorization system (U.S. Pat. No. 4,606,625) permit the application of algorithms with separately adjusted parameters (such as color specification or digital filtering parameters) to be applied to distinct areas of images in an image stream. Typically (in Inventor's systems) parameters are specified and adjusted in a small percentage of images from a moving sequence; the computer being capable of interpolating the practitioner's instructions for the intervening frames. Thus, it is not only common practice to fine tune parameters for a particular image, but also for individual areas of a given image.

Further still, it is common practice to "color correct" each individual scene of a motion picture film as it is printed, or transferred to video. Considerable time and effort, by highly skilled practitioners, is spent adjusting the parameters separately for individual scenes to achieve a desired overall "look".

Thus, in commercial applications of motion picture and television image manipulation processes, large amounts of time, effort and expense are expended in experimenting with the adjustment of operational parameters in an effort to achieve, as closely as reasonable, a desired result. And, this may be done for individual images, image sections, or motion scenes.

One of the major applications intended for the instant invention is the incorporation of the algorithms disclosed herein into a film chain (a film to video transfer device). Such transfers are an important and costly part of the television motion picture industry. Much time and effort is expended in achieving desired and artistic results. And, in particular, as described above, the scene-by-scene color correction of such transfers is common practice. Further, such transfer from film to video can be accomplished on an off-line, frame-by-frame basis, with the accompanying image processing components taking an arbitrarily large amount of time to accomplish the computations required for encoding a particular film frame to a particular video frame.

Thus, in the instant disclosure, it will be suggested that practitioners make adjustments to the operational parameters of the disclosed algorithms in order to better achieve desired results. Further, it will be suggested to such practitioners that such individual adjustments may be applied to images or image portions exhibiting different characteristics.

Commercial black & white and, later, color television has been available since the 1940s. American and Japanese systems offer 525 line frames, 30 times each second, while most European systems offer a higher resolution 625 line frame but run at a frame rate of 25 per second. Higher resolution military and laboratory video systems exist and, recently, a commercial high definition television standard (HDTV) has been developed to improve delivered image quality.[7]

In the U.S., motion picture film is projected at 48 frames per second (FPS) by showing each of 24 pictures twice. Recently, a system was developed by Douglas Trumbull called Showscan. It provides 60 FPS, with 60 pictures each shown only once, to improve visual quality.

When color was added to U.S. black & white television, it was decided to adopt a "compatible" system, which enables black & white sets to receive color television signals and display them in black & white, while color sets display the same signals in color. Similarly, it has been suggested that the HDTV signal be compatibly receivable by standard televisions displaying standard resolution pictures, as well as by HDTV receivers. HDTV provides both more video lines and more pixels (from PICture ELements: visual data points) per line. It has been suggested that the standard television channels may be used to transmit a "compatible" standard resolution signal while a second channel (not receivable by a standard television) be used to transmit the "inbetween" higher resolution information. However, HDTV may also display a wider picture when compared with standard television. Inclusion of the extra "side strips" in a compatible broadcast system has been one of the main problems.

It is established practice to transmit motion picture film, which has a much higher resolution and a different frame rate, over a broadcast television channel by use of a film chain. Essentially a motion picture projector coupled to a television camera, the film chain synchronizes the two imaging systems. In newer film chain systems the video camera has been replaced by a digital image sensor and digital frame store. In the U.S., each video frame consists of two interleaved video fields, resulting in 60 fields per second. U.S. film runs at 24 frames per second. This results in a ratio of 2.5 video fields per film frame. Practically, this is achieved by alternating 3 repeated video fields and 2 repeated video fields for alternate film frames. The spatial resolution of the image is reduced by the characteristics of the video camera.

It is also established practice to generate synthetic television signals (without a camera) by using electronic devices such as character (text) generators, computer graphic systems and special effects generators.

Recent developments in home televisions and VCRs include the introduction of digital technology, such as full-frame stores and comb filters.

There exist many techniques for bandwidth compression of electronic signals, a number of which have been applied to television systems. These are particularly useful for transmitting images from space probes or for satellite transmission, where resources are limited.

The off-line, or frame-by-frame, recording of frames computed by computer animation programs is a well-known standard practice. Off-the-shelf hardware and software exist that permit both low- and high-end graphic systems to commit such images to film or video.[8]

U.S. Pat. No. 4,631,584 issued to Reitmeier teaches how to display reduced resolution (but, otherwise, not encoded) side strip information incorporated into the horizontal blanking intervals of the current frame and the current line. He accomplishes this by changing the clock signal of the electron beam in order to "stretch" (at the display) his compressed side strip information.

The instant invention, on the other hand, utilizes vertical blanking intervals as well horizontal and permits information (side strip or otherwise) to be stored non-adjacent to the standard image information with which it is to associated or integrated. In particular, the additional information may be encoded into the blanking intervals of a frame far ahead of the frame containing a "center portion" with which it is to be integrated. Thus, by arriving early, this information may undergo a relatively long and complex process of decoding, decompression, preparation and integration before it needs to be displayed. Therefore, complex and sophisticated encoding mechanisms may be employed in order to compress the additional information into the available "empty" spaces.

DESCRIPTION OF INVENTION

The instant invention relates to a method of signal encoding that is particularly useful for preparing a high-definition television signal for transmission over a channel intended for lower resolution signals. It can also be used to improve the perceived quality of television systems, or for other purposes.

In brief, the invention comprises a system for selecting a subset of information to be transmitted, from all the information in a frame, and for varying the parameters of selection from frame to frame. This results in the reduction of transmitted information, and improved perception on the part of the viewer when compared to non-varying selection schemes. In addition, techniques and systems for incorporating additional information, such as HDTV side strips, into the blanking intervals of a previous frame are described, to affect the foregoing, but which also can be independently practiced to great advantage.

To that end, the instant invention utilizes vertical blanking intervals as well horizontal and permits information (side strip or otherwise) to be stored non-adjacent to the standard image information with which it is to associated or integrated. In particular, the additional information may be encoded into the blanking intervals of a frame far ahead of the frame containing a "center portion" with which it is to be integrated. Thus, by arriving early, this information may undergo a relatively long and complex process of decoding, decompression, preparation and integration before it needs to be displayed. Therefore, complex and sophisticated encoding mechanisms may be employed in order to compress the additional information into the available "empty" spaces.

In order to understand the invention more fully, it is helpful to examine certain aspects of film and video display systems, their shortcomings, and the functioning of the human visual system.

Theory of Operation

The basis of the instant invention is that the human visual system is capable of, and sometimes even works better by, reconstructing information that is presented over time.

A simple example of this involves a picket fence. If a viewer looks fixedly through a picket fence, about half the scene will be hidden from view and the pickets will be clearly defined. However, if the viewer shifts the head back and forth, or walks briskly by the fence, the perception will be of seeing the entire scene, even though half the scene will be missing at any given instant. The pickets will also become less noticeable. The human eye/brain system is capable of reconstructing the scene from the stream of partial views and of disregarding the sampling scheme imposed by the (relatively moving) pickets.

In the parlance of this application, both these cases constitute bandwidth compression (half the scene is hidden at all times); but, the fixed view is a static STS, and the moving perspective view is a variable STS. Thus, the eye is capable of reconstructing information presented through a varying sample window.

Other aspects of human vision indicate that varying information is preferable to static information. As described above, repeating identical information to the eye, as with theatrical motion picture film projection, creates the perception of muddiness or opacity. Certain structures in the retinex, such as edge detectors and motion detectors, only work in differential mode. That is, they do not work when presented with information that is temporally or spatially uniform. Another (although, longer term) phenomenon is visual fatigue or after-imaging. The receptor elements in the eye become exhausted by looking at a fixed image. The scene will eventually become almost invisible (if the view remains constant) and a negative of the scene will be perceived upon finally looking away.

The human eye vibrates with a continuous tremor of 30 to 80 Hz. during its normal function. The retinex is able to reconstruct a stable detailed image from this vibrating input. It may, in fact, yield a more detailed image than could be constructed from an absolutely stable eye and may help prevent the perception of the structure of, or defects in, the retinex itself.[9]

A similar situation results from the way in which motion picture film is manufactured and used. Film images are made up of a random distribution of photosensitive particles collectively called "film grain". When blown-up on a large screen the grain structure would be more easily seen, however, because the distribution changes from frame to frame the grain structure is generally not perceived. There are two ways that still images are added to motion picture presentations. With one technique a still scene is filmed on a number of film negative frames. Each has a different grain structure and, thus, when the sequence is projected (or viewed on a video monitor) the film grain structure is not noticed. The other technique calls for "step printing" the same film negative on many frames of the print to be projected (or to repeatedly oscan the same film frame in a film chain). In this case the same film negative frame, with the same grain structure, is viewed repeatedly and the grain structure becomes more noticeable. The frames of the motion picture print also have grain structure, however, since this structure always changes (unless the projector jams or is stopped) the print film grain structure is not noticed.

The tremor function provides variation to the STS of human vision. Thus, the retinex may be better suited to deal with variable STSs than static.

The retinex has the ability to reconstruct a scene from bits and pieces spread over space and time. It is possible to take advantage of this ability by presenting a succession of moderate bandwidth pictures (subsets of full-definition images), taken through varying sample windows, and to have the retinex reconstruct a higher resolution scene.

Thus, for some embodiments, the compressed transmitted data points will be directly displayed on a monitor of resolution that is comparable to the transmission channel. Reconstruction, or collection, will occur in the retinex. Improved perception will result, when compared with standard transmission over the same channel and display. Thus, the technique may be used to improve perception of material transmitted for standard systems. It is only the camera and/or transmission parts of the system that would be replaced; standard reception and display elements would be used in this embodiment. This is in marked contrast to most bandwidth compression techniques, which utilize complex coding schemes that require complex decoding before display. For example, an image compressed by run-length encoding would appear as gibberish if the data were displayed directly, without proper decoding.

Other embodiments will present the results on a higher definition (compared to the channel) display. The "holes" between the transmitted points may be smoothed over by interpolative techniques, or intermediate data may be (approximately) "reconstructed" by computation.

Referring to FIG. 1, the top configuration (100–104) depicts a standard encoding/decoding (101/103) bandwidth reduction scheme. The bandwidth of the source (100) and display image (104) are equal and higher than the bandwidth of the channel (102).

The bottom configuration (110–114) depicts one class of embodiments of the instant invention. The bandwidth of the source image (110) is higher than both the channel (112) and the display (113) which are comparable to each other. Decoding (114) occurs after display (113), as it is viewed (114), and it is only in the retinex (114) that the image is reconstructed.

The goal of most bandwidth compression schemes is to "squeeze" a given information signal into a smaller channel. A main goal of the instant invention is to "squeeze" (111) a larger picture into a given channel. Although this may at first sound as a semantic difference only, there is a significant practical difference.

Broadcast television in the U.S. is a "given channel" that is unlikely to change for the foreseeable future. Bandwidth compression schemes that would allow the use of a smaller transmission channel (102) and require complex decoding at destination (103) could not be used with the many millions of existing home receivers (e.g., 104). The bottom configuration (110–114) shown in FIG. 1 requires no decoding equipment prior to display (113); decoding is accomplished in the human eye/brain (114). Therefore, it can be used with existing distribution and reception/display equipment (113).

It should also be noted that the "channel" (112) shown in the bottom part of FIG. 1, can incorporate a standard encode-transmit-decode system (101-102-103), as shown above. In this way, the varying STS scheme (e.g., 111) will function as a pre-selection or thinning function, prior to applying some other compression algorithm (e.g., 101), such as run-length encoding, delta encoding, etc.

Static Sampling Schemes

The visual artifacts of film and video systems are perceivable because the STS of each system is constant. Many times each second, images are presented to a viewer. While these image streams approach viewing a real scene, they represent only a small subset of the available information. The way in which the subset of information is selected remains constant, frame after frame after frame, while the content of each frame is different. In this way the "shape" of the STS is re-enforced by being superimposed over many different images. Perceived visual anomalies result.

In order to select a subset of a relatively high-resolution television signal for transmission over a lower bandwidth channel, two straightforward approaches are depicted in FIG. 2 and FIG. 3.

In both cases, the reduction is by a factor of four; by half in both the horizontal and vertical directions. Two-by-two cells of pixels are labeled with subscripts representing the row and column of the cell. Within the cell, individual pixels are labeled A, B, C and D.

In the FIG. 2, the upper left corner element (A) of each two-by-two pixel cell, is transmitted (*) for every cell, in every frame of the source image. This pixel value is used to reconstruct the entire destination cell in the destination image. Picture details that fall in pixels labeled B, C or D do not get transmitted or displayed at all. As a small visual detail moves across the screen it would pop on (as it passes A*) and off (as it passes B, C or D).

In FIG. 3, all four picture elements from each two-by-two cell in the source image are averaged, as by a low-pass digital filter, to derive the pixels of the destination display cell. The average of A, B, C & D is denoted by X. Here individual small details are lost as they are averaged with the neighboring three pixels.

Both approaches exhibit defects. In the first, small details pop on and off, in the second, small detail is lost in the blur. This is because the method of selecting the subset of information—the STS—is constant from frame to frame. The "shape" of the static STS is re-enforced by viewing changing content upon which the same STS is repeatedly imposed.

Varying the STS

Although each is unique, the successive frames of a standard film or video presentation each have much redundant information in common with their neighbors. The STS of the present invention varies from frame to frame. By this scheme, the differences in the STS that is applied to successive frames is comparable to, or will even exceed, the differences in the content of successive frames. Therefore, the shape of the STS will not be re-enforced from frame to frame. Thus, sampling artifacts will be obscured, as they change from frame to frame, and the perception of visual anomalies, resulting from the overall varying sampling scheme, will be minimized.

Frame Store Techniques

For a single still image, 4:1 bandwidth compression may be achieved by the processes depicted in FIG. 2 or in FIG. 3 for each transmitted frame. In either case, the same source image will be processed according to the same STS for each frame, resulting in a repeat of an identical destination frame. For the simple case of the instant invention, depicted in FIGS. 4A through 4D, 4:1 compression is also achieved but with improved perception on the part of the viewer. Four different destination frames are derived from the same source image, using the varying STS, and presented in sequence. (In any of the above three cases, post-transmission filtering, such as bi-linear interpolation, may be used to improve image smoothness).

However, if it were known that a still image were to be transmitted for a number of frame times, the simple varying STS scheme depicted in FIGS. 4A through 4D could be adapted to a variation that will provide further benefits. Assuming that the destination display incorporates some digital frame-store[10] or other memory function, the information from all four frames can be accumulated and used to completely reconstruct the original high-definition source image. This "accumulation mode" would not provide similar benefits if implemented with either of the two static STS schemes depicted in FIGS. 2 and 3, since the information from successive frames would be identical.

With this scheme, once four frames were collected the oldest of the four could be discarded and replaced by the newest as it came in. The same principle could be applied to other patterns or distributions of data points and the scheme may be varied (as described below) over the frame or over time.

Another technique can be implemented on a relatively high-definition display with a built-in frame store. Normally, a frame store provides data storage for each pixel that can be displayed by the monitor[11]. However, by using the varying STS technique, bandwidth is compressed by transmitting data for only a sub-set of display points. Only some of the memory locations in the frame store would be required to store incoming data for an image frame. (Additional pixels could be used to hold data from previous frames, as in the accumulation mode described above; or, to hold intermediate data points created at the destination display.)

By this scheme, the number of pixels (i.e. resolution) in the frame store would not need to be as high-definition as the display, at any given frame. However, since, over the course of many frames, data will be sent for all (or many) of the points that can be displayed on the high-resolution monitor, data storage points would be required for all those display points. This is because, in standard frame stores, a stored information point can only be displayed at one specific display point. Therefore, the resolution of the frame store would need to be comparable to that of the display, to accommodate the different points at different positions to be displayed over time.

The technique described below will allow a low-resolution frame store to be used with a high-resolution display when implementing a variable STS scheme. The scheme described in FIGS. 4A through 4D will be used as an example. For each 2×2-pixel-cell only one data point is transmitted at each frame and is displayed at the destination position that it occupies in the source image. The other three are derived from repeated data, or intermediate data derived by interpolation or reconstruction. While storage for all four pixel positions in the display cell are needed over time, only one of four is needed at each frame. If the position of the display point associated with the information storage point could be moved, then one storage space per multi-pixel cell would suffice.

In standard frame store devices, display data is read from digital memory and used to specify the color and/or intensity of pixels on the screen. The "look" of the displayed pixel is determined by the data contents of the associated memory location; the position of the displayed pixel is determined by the address of the memory location[12]. In some frame stores several different modes are available that "map" the memory locations to display screen locations in different ways. But for each mode the mapping is constant from frame to frame[13].

A specialized frame store device would facilitate the implementation of the varying STS technique. It is described below. In the specialized frame store the "look" of the pixel is still determined by the contents of the memory location. However, the location of the displayed pixel on the screen is determined by the address of the memory location plus an offset that can be determined in several ways.

One way would be appropriate to the varying STS scheme described in FIGS. 4A thorough 4D. In this case the position of the entire raster would be adjusted to coincide with the upper-left pixel of the multi-pixel cell for FIG. 4A. Similarly, for other frames, shifts would be made to coincide with the upper-right, lower-right and lower-left for FIGS. 4B, 4C and 4D, respectively. Other patterns may also be used to "wobble" the entire display. These would be synchronized with a corresponding "wobble" in the video camera or transmission system.

In another implementation the "wobble", perturbation or offset would be applied independently to individual pixels, or groups of pixels. Groups of pixels may correspond to small geometric areas (neighboring pixels or multi-pixel cells, for example); or a group may consist of a distribution of pixels spread out over a large section of, or an entire, image frame. In this case the complex pattern of offsets for each frame could be pre-determined and synchronized with the camera or image creation system.

Alternately, pixel (or pixel group) position offset data could be stored along with pixel content data in the frame store. The display location of a pixel would then be determined by the address of the memory location and an offset that was stored and associated with the individual pixel or pixel group. A specific case for 2×2 multi-pixel cells is described next.

In standard frame stores pixel content data is stored for each pixel. For example, if eight bits each were required for Red, Green and Blue display data, each pixel would require 24 bits and the 2×2 cell would require 96 bits of data storage (24 bits for each of four pixels). In the specialized frame store 24 bits would be required for display content data (8 each for Red, Green and Blue). An additional 2 bits would be stored with each 24-bit pixel data. These two bits would be used, for example, as follows:

| EXTRA BIT 1 | EXTRA BIT 2 | PIXEL DISPLAY LOCATION |
| --- | --- | --- |
| 0 | 0 | Upper-left pixel of cell. |
| 0 | 1 | Upper-right pixel of cell. |
| 1 | 0 | Lower-left pixel of cell. |
| 1 | 1 | Lower-right pixel of cell. |

In this way, for each 2×2-pixel cell, storage requirements have been reduced from 96 bits to 26 bits. If groups of 2×2 pixel cells were to be offset in like manner, the 2-bit position specification would only have to be stored once for the entire group.

When this type of frame buffer is used with a monitor, the offset may be applied to the electron beam deflection mechanism[14] to implement the wobble of the entire image or individual pixel elements. Beam de-focussing may also be applied to cover the "holes" between transmitted pixel data.

Another technique may be used to fill the holes, or to other benefit. Besides adjusting the position of displayed pixels, the size or shape of pixels can also be adjusted. Again, these adjustments to the pixels may be designated by pre-determined pattern or from data stored with the pixel content data, and may be applied to individual pixels, pixel groups or to an entire frame uniformly. For example, one particular information point may be displayed as a single pixel one time, and as a 2×2 square in another frame. Or, one data point may be displayed as a single pixel in one frame, as a two-by-one pixel block in another frame, and as a one-by-two pixel block in still another frame.

Alternately, and particularly with higher-resolution monitors, intermediate display data would be created to fill the "holes" between transmitted pixel data. This may be done using a digital (or analog) filter to perform simple interpolation or by a more complex reconstruction algorithm. The creation of the intermediate data could be done on the fly, by accessing several data points from the frame store and computing intermediate values. But a low-cost frame store may not provide fast enough data access for complex point-oriented display processing. Therefore, several lines of frame store data may be transferred to a smaller amount of very high-speed memory. This high speed memory can also be of higher resolution (then the rest of the frame store) so as to provide a place to temporarily store the calculated intermediate display data, until they are displayed.

Multiple frame stores, of either standard or specialized construction, can be contained in a single display. They can be used to advantage if implementing a complex interpolation or reconstruction algorithm. For example, one frame store can be used to compute the incoming frame while another frame store is being scanned out to display the previous frame. Two frame stores can be alternated in this fashion, or more than two can be installed in a "pipeline" allowing several frame times to be used to process a frame, once it has been received.[15]

Several frame stores can also be used to store several sequential incoming frames. These can then be displayed, in interleaved manner, to implement the accumulation mode, which can be applied to the entire image or in limited areas.

This discussion has made specific reference only to the sampling pattern described in FIGS. 4A through 4D. However, any of the patterns, techniques and variations described elsewhere in this disclosure can be used in conjunction with these frame store techniques.

Variable Algorithm Over Image Frame

As described above, the varying STS principle may be implemented in numerous embodiments, which may be fine tuned for images or image sequences with different characteristics. For example, the "accumulation mode" described above may improve visual quality for image sequences that have little or no movement, for a period, or for images of text or graphics. It is also possible that certain images or image sequences will have different characteristics in different areas and that the shape or position of those areas will change, over time, from frame to frame.

Many image analysis techniques now exist and other useful techniques may continue to be developed. Similarly, techniques and algorithms now exist, and may later be developed, that can be used to encode area shapes, edges or boundaries. These algorithms and techniques can be used to analyze and specify various areas of different image characteristics. The analyses can be made on a single frame basis, or by comparing progression or change over two or more frames.[16]

Once a frame is analyzed and separated into multiple areas of different characteristics, different versions of the encoding technique can be used for those several areas. These variations of the encoding technique can be designed so that the encoded image can be decoded using a uniform decoding technique over the whole image.

Alternately, a multiplicity of fine tuned decoding algorithms can be used on different areas of the image. The shapes of the decoding areas need not be identical to the encoding areas. The different decoding areas may be determined by analysis at the destination display or, the decoding areas may be derived from area specification information, to be included with the image data in the transmitted signal or transmitted separately.

An image can be displayed with several decoding algorithms, even if it were encoded with a single uniform algorithm. For example, although an image stream were encoded uniformly, the accumulation mode algorithm can be applied to limited areas (with little or no movement, or containing text or graphic information), while elsewhere, information is discarded as soon as it has been displayed.

The method of specifying area shape can be varied depending upon: the encoding/decoding algorithm, image characteristics, the characteristics of camera, transmission or display equipment, or, constraints imposed by transmission bandwidth, computing power or time. For example, areas can be limited to groups of rectangles, triangles, polygons, or other shapes, or may be freely specified on any pixel, or multi-pixel cell, boundary. Limits can also be placed on the number of distinct areas in an image(s), or on the maximum change of area specification from frame to frame.

If the constraints of image complexity, time or computing power do not allow for real-time analysis and/or separation of images into areas, analysis can be done off-line[17] for certain applications. For example, a relatively long time may be spent on the analysis and encoding of the frames of a motion picture film, prior to transmission. The encoded results, perhaps with area specifications would then be stored on videotape (or other medium) for real-time playback, transmission, and display, at a later time. Alternately, frames can be computed, transmitted and recorded off-line, for real-time playback at a later time.

Figure 7:
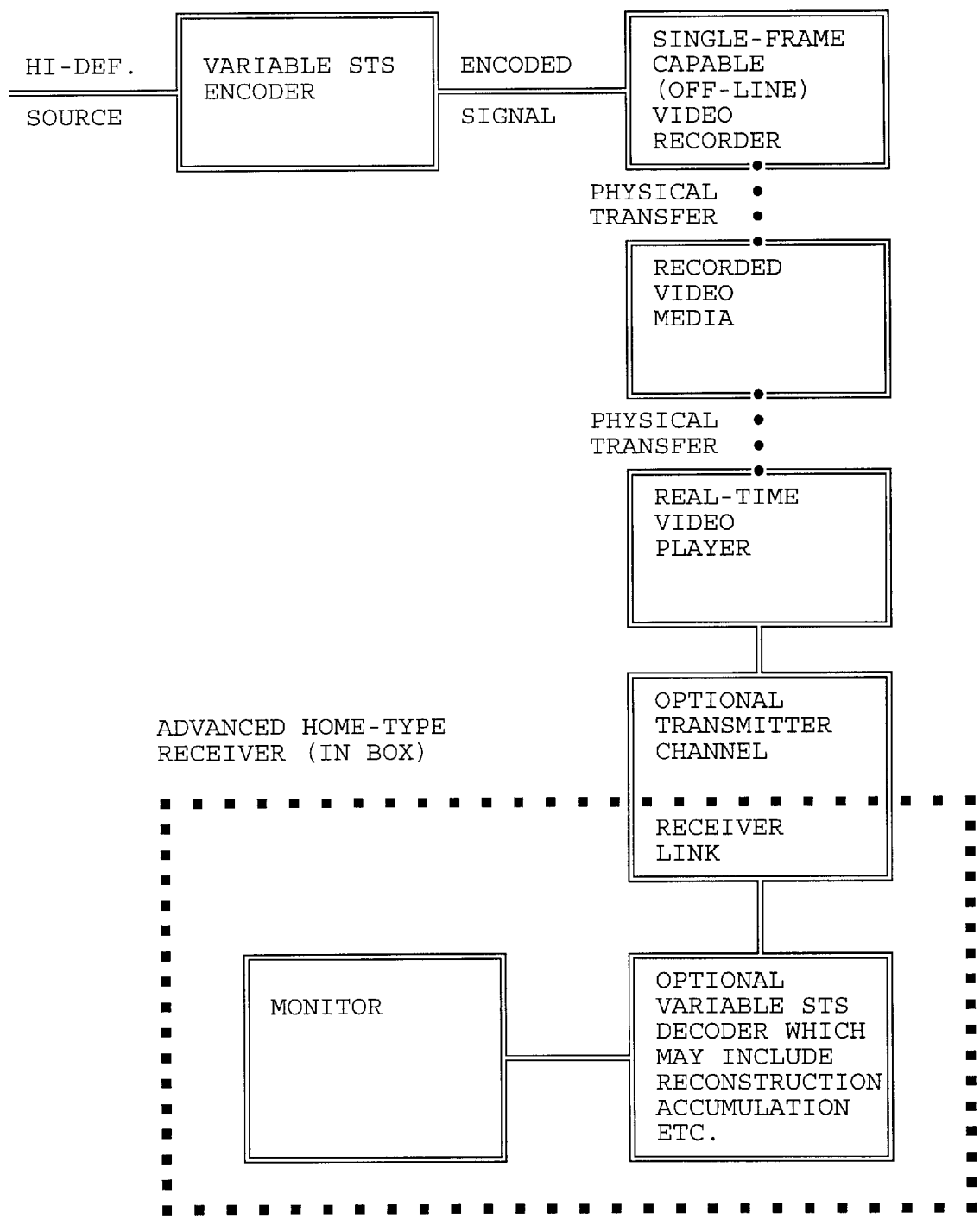
FIG. 7 is a system diagram depicting off-line recording and real-time playback/delivery of an encoded video signal."

FIG. 7 depicts the "off-line recording" process described above. The dotted box in FIG. 7 indicates which system elements one might expect to find combined in a typical "advanced television receiver" which are currently available at least in laboratory settings.

For interlaced video systems, with frames consisting of two interleaved fields, each containing only odd or even lines, the grid can be overlaid on the whole frame, or on each field separately.

Standard interlaced television cameras only scan half of the possible raster lines for each field. For some embodiments of the instant invention, it will be necessary to use cameras that scan all lines of an interleaved frame in one field time, or can even scan at a rate higher than one full frame for each field. One "field's worth" of information will then be selected, encoded and transmitted according to the techniques described herein. For some applications, e.g. a film chain, it will be possible to use a very high resolution camera that scans slower than real-time. The encoded frames can then be recorded on videotape, or some other medium, for real-time playback and/or transmission.

Practical Applications

Digital technology has become commonplace in home television equipment as well as in broadcast equipment. Digital controls, comb filters and even whole-frame digital image stores are now available in home televisions and VCRs. Industrial and broadcast equipment is becoming even more sophisticated. Certain embodiments of the instant invention will prove useful on even the simplest of standard television equipment. Other variations will be best implemented using the newer digitally capable equipment. For example, the "accumulation mode" would require some sort of frame store.

Since HDTV broadcast systems are not in place, standards have not been finalized, and home HDTV receivers are not yet available, it would be possible to include new hardware features (to implement the more complex features of the instant invention) in HDTV equipment without having to worry about incompatibility with existing HDTV systems.

Regarding compatibility between HDTV and standard NTSC broadcast television: some variations of the present invention will provide direct compatibility by displaying the encoded low-bandwidth image directly on a standard television, while the fully decoded, processed and reconstructed (or "accumulated") image would be displayed on a high definition monitor. However, the specific high definition system known as HDTV is wider than standard television by approximately 20% and the incorporation of the "side strips" is a problem not directly addressed above. However, there are portions of the television frame (totaling approximately 10%–15%) during the blanking intervals of the signal, unused for picture information. It is already common practice to store and broadcast digital information in some parts of the blanking intervals.[18] Utilizing the bandwidth reducing capabilities of the instant invention or other encoding techniques, the "side strips" could be compressed, and then encoded into the blanking intervals (or the blanking intervals of a previous frame, to allow more time to decode and reconstruct a more complex and dense coding scheme) and reconstructed, upon reception, by special HDTV televisions. The quality of the "side strips" may suffer slightly when compared to the rest of the image. However, those areas of the image are peripheral and therefore somewhat less critical to viewing.

For those variations of the invention that are not suitable for "compatible" broadcast television, or for HDTV, there are other useful applications. For example, specially encoded "premium" channels could be distributed, by cable or direct satellite broadcast, for reception by special home televisions. Similarly, non-standard "premium" channels could be made available for delivery of special sports or entertainment events to theaters or arenas. Such premium channels may require special television camera or recording equipment to produce the required signals or tapes. In particular, however, transferring movies using a special film chain would require only a limited amount of special production equipment. The popularity of pay movie channels may well justify the added production costs and even the cost of special home receivers.

The invention can also be used to reduce the bandwidth required to record television signals or to increase the amount or quality of information that can be recorded on existing VTR systems. Such systems can be incorporated into VCR (or videodisc) units to improve their recording and/or playback operation, or to provide extra performance when playing tapes (or videodiscs) that have been specially pre-recorded. Similarly, specially recorded tapes can be used in theaters, with special playback and/or display equipment, for high quality electronic cinema. In particular, the new digital tape recorder (DTR) can be adapted to making recordings for the instant invention. A version of the invention can also be used for industrial, commercial, broadcast or scientific image recording systems. Lastly, the varying STS scheme can be applied for bandwidth compression and/or improved perception when recording audio or other signals, as well as for image information.

In addition, the mechanism of densely encoding additional information in previous blanking intervals may be applied to purposes other than for the incorporation of side strip information. Such potential applications include the incorporation of data that may represent: additional definition; information that may be used to convert a monoscopic image into a left and right pair, or the second of a pair (see Inventor's referenced U.S. Pat. No. 4,925,294 and patent application No. 07/951,267); various area maps which may be used to apply a multiplicity of algorithms to separate areas of an image; motion analysis information; interactive or gaming information; multimedia or hypermedia information; or, otherwise.

The potentially complex nature of the decoding may require "pipelined architecture" at the receiving end in order to affect the processing of that information over several frame times with a multiplicity of limited processors. Further, the complex nature of the decoding, as well as the "look-ahead" nature of the encoding (encoded into the current frame's blanking intervals is information regarding a subsequent frame's information) may be facilitated by the "off-line" computation and recording techniques disclosed herein.

DESCRIPTION OF PREFERRED EMBODIMENTS

What follows is a detailed description of drawings that will illustrate several preferred embodiments of the instant invention.

Figure 5:
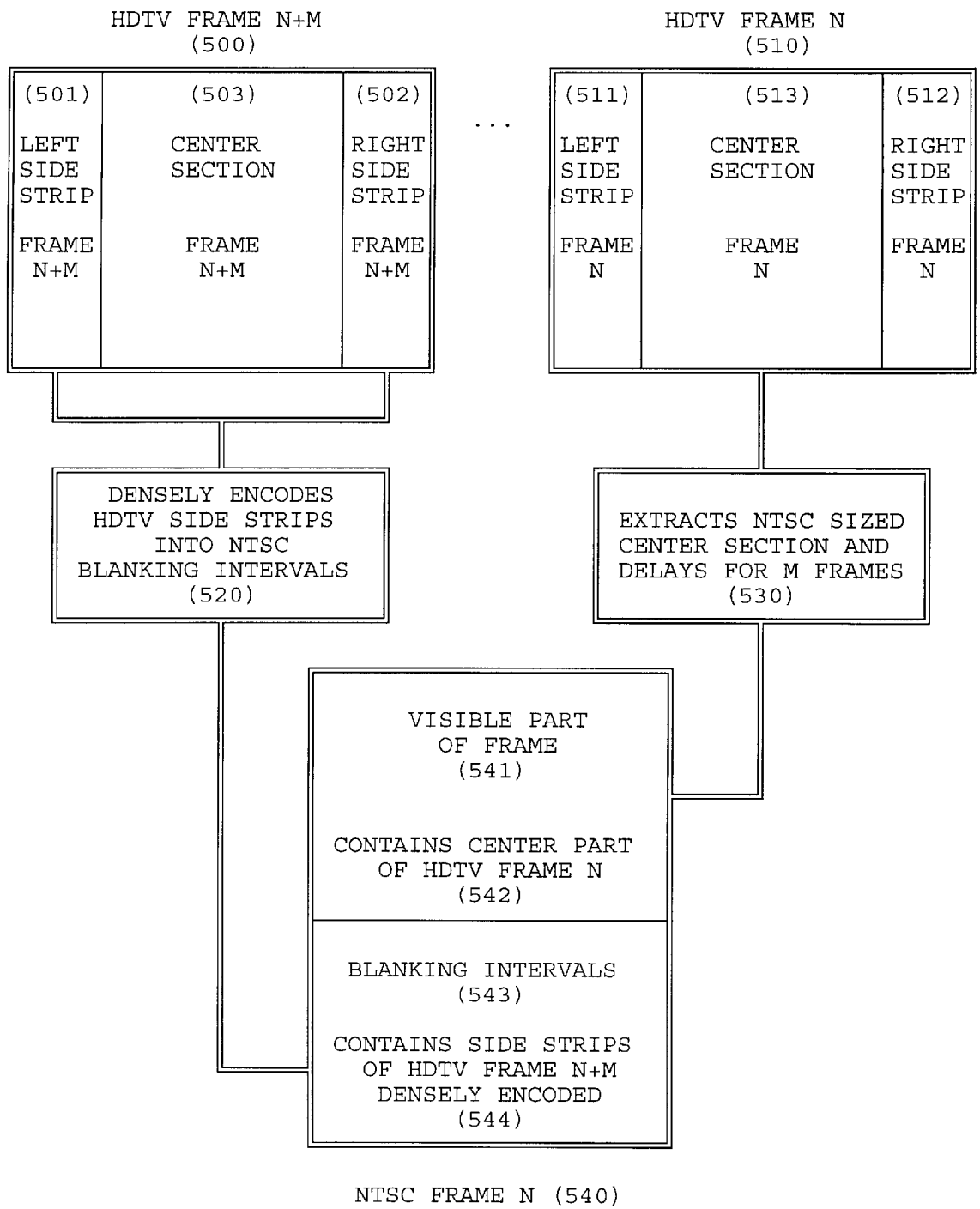
FIG. 5 is a system diagram depicting the encoding of HDTV "side-strips" into NTSC blanking intervals, which can be of a previous frame.

FIG. 5 depicts the encoding process (500–544) and device (520 & 530) described above in the section entitled "PRACTICAL APPLICATIONS", for use with an HDTV signal (500 & 510) with "side strips" (501/502 & 511/512). Shown are two HDTV frames (500/501/502/503 & 510/511/512/513) (which may be the same frame if M=0) separated by M frame times. The center portion (513) of HDTV frame N (510) (roughly corresponding to an NTSC 4/3 aspect ratio frame) is extracted and stored or delayed (530) for M frames. The "side strips" (501 & 502) of subsequent HDTV frame N+M (500) are encoded (520) and inserted into (544) the blanking intervals (543) of the same NTSC frame (540) into which the earlier center section of N (513/542) is now also inserted (541) to create an NTSC frame (540) containing the "center portion" of HDTV frame N (542 in 541) and the encoded "side strips" of HDTV frame N+M (544 in 543).

Figure 6:
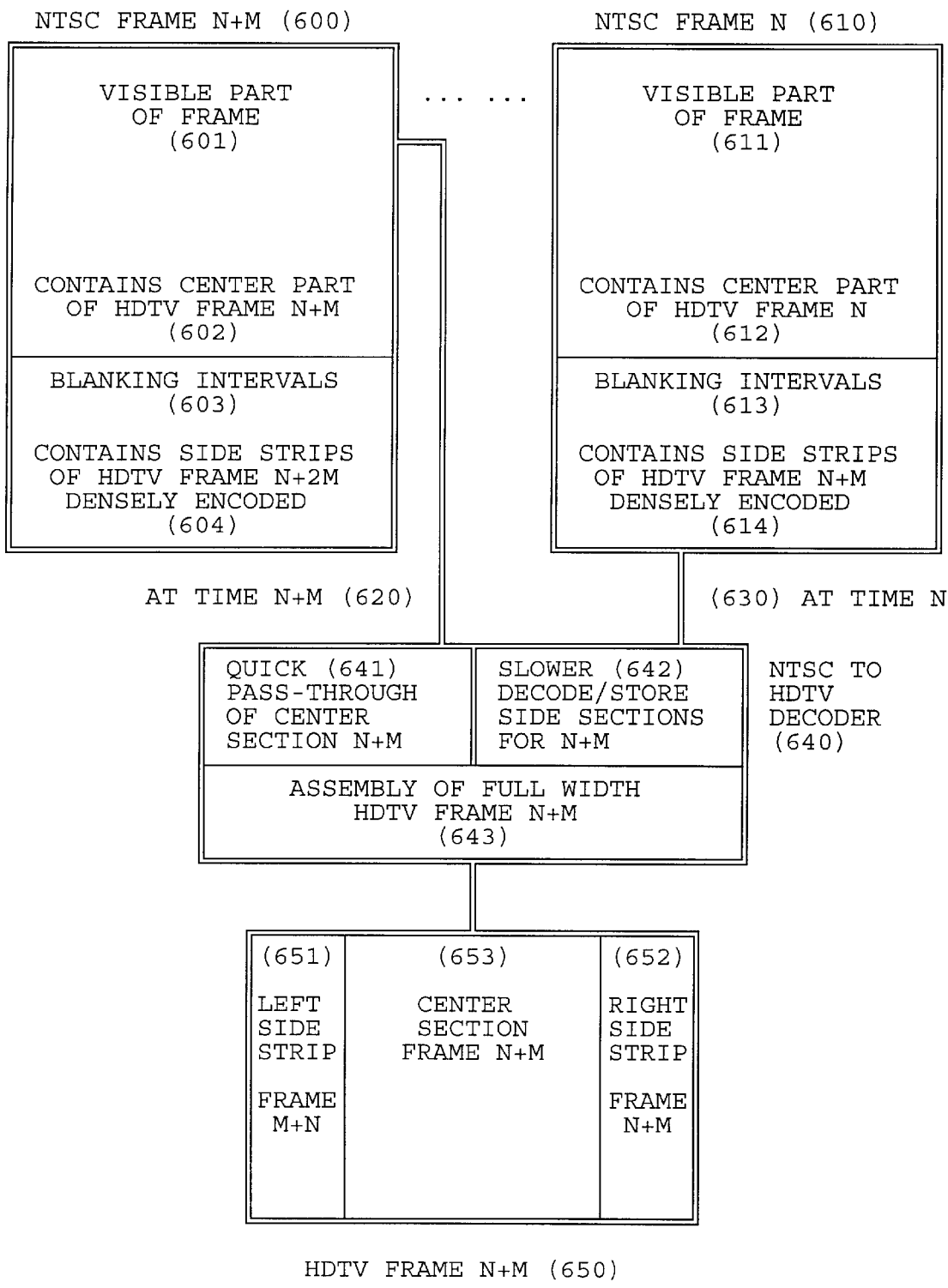
FIG. 6 is a system diagram depicting the decoding of HDTV "side-strips" from NTSC blanking intervals, which can be of a previous frame.

FIG. 6 shows the complementary process/device (600–653/640). Two frames separated by M frame times (600 & 610) (which may be the same frame if M=0) are depicted. NTSC frame N (610) contains (in 611) the "center portion" of HDTV frame N (612) and encoded in its blanking intervals (613) the "side strips" of later (by M frame times) HDTV frame N+M (614 in 613). Similarly, NTSC frame N+M (600) contains (in 601) the "center portion" of HDTV frame N+M (602) with the encoded "side strips" of HDTV frame N+2M (604 in 603). At time N (630) the encoded information containing the "side strips" of HDTV frame N+M (614) (contained in the blanking intervals (613) of NTSC frame N (610)) is directed to a "slow" decoder (642) (which may take up to M frame times to decode this information back into the visual information representing the HDTV "side strips" (651/652)) and storage unit (642). M frame times later (620) the standard NTSC image (601) of frame N+M (600) which contains the center section of HDTV frame N+M (602), is routed by the "quick pass-through" section (641) to a unit which assembles (643) that information (601) with the delayed and stored "side strip" information (614) and outputs a complete HDTV frame N+M (650/651/652/653) at time N+M (620).

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. A process for modifying a television signal comprising the steps of:
   a. encoding into at least one blanking interval of a first field of said television signal, supplemental image information associated with a second, distinct, subsequent field of said television signal; and,
   b. utilizing said supplemental image information in association with said second, distinct, subsequent field of said television signal.

2. A process as in claim 1 comprising in addition:
   c. said supplemental image information is associated only with said second, distinct, subsequent field; and,
   d. the step of processing said supplemental image information is performed between steps a. and b.

3. A process for modifying a television signal comprising the step of:
   encoding into at least one blanking interval of a first field of said television signal, supplemental information intended to be presented to a viewer, in association with, but not before the display of, a second, distinct, subsequent field of said television signal, wherein said television signal is of a particular width and at least some of said supplemental information comprises side sections utilized to make the displayed image wider.

4. A device for displaying a wide aspect ratio television signal comprising:
   a. a system component to derive the center section of its display from a first field or frame of said television signal; and
   b. a system component to derive the side sections of its display from information encoded in the blanking intervals of a field or frame previous to said first field or frame of said television signal.

5. A process for displaying a high-definition information bearing signal consisting of:
   a. inputting a relatively low-definition information bearing signal comprising a first set of data points;
   b. deriving intermediate display information from said relatively low-definition information signal to generate a second set of data points;
   c. retaining at least some data points from the group of data points comprising said first set of data points and said second set of data points to create a third set of data points; and
   d. simultaneously displaying in an intermingled fashion said third set of data points in combination with a first set and a second set of data points derived from a subsequent portion of said relatively low-definition information bearing signal.

6. A device for displaying a high-definition information bearing signal by the process of claim 5, comprising:
   a. a system component for inputting a relatively low-definition information bearing signal comprising a first set of data points;
   b. a system component for deriving intermediate display information from said relatively low-definition information signal to generate a second set of data points;
   c. a system component for retaining at least some idata points from the group of data points comprising said first set of data points and said second set of data points to create a third set of data points; and
   d. a system component for simultaneously displaying in an intermingled fashion said third set of data points in combination with a first set and a second set of data points derived from a subsequent portion of said relatively low-definition information bearing signal.

7. A process for displaying a high-definition television image comprising the steps of:
   a. inputting a television information signal;
   b. retaining over time at least some of the information comprising said television signal to generate a retained information signal; and
   c. simultaneously displaying a portion of said television information signal comprising information from one frame or field and a portion of said retained information signal comprising at least some information derived from a second, distinct frame or field in an intermingled fashion.

8. A device for displaying a high-definition television image by the process of claim 7, comprising:
   a. a system component for inputting a television information signal;
   b. a system component for retaining over time at least some of the information comprising said television signal to generate a retained information signal; and
   c. a system component for simultaneously displaying a portion of said television information signal comprising information from one frame or field and a portion of said retained information signal comprising at least some information derived from a second, distinct frame or field in an intermingled fashion.

9. A device for displaying an enhanced video image comprising:
   a. a system component to derive standard display information from a standard video signal;
   b. a system component to derive additional display information from information encoded in portions unused for picture information of said standard video signal;
   c. a system component to store said additional display information to create stored additional display information; and
   d. a system component to simultaneously display said standard display information and said stored additional display information, said additional display information being derived at least in part from information encoded in at least one previous frame distinct from the frame containing the currently displayed standard display information.

10. A device as in claim 9 wherein said additional display information comprises additional resolution information.

11. A device as in claim 9 wherein said additional display information comprises three dimensional information.

12. A device as in claim 9 wherein said additional display information comprises Hypermedia information.

13. A device for displaying a high-definition television image comprising:
   a. a system component to derive standard display information from a standard television signal;
   b. a system component to derive additional display information from information encoded in the blanking intervals of said standard television signal;
   c. a system component to store said additional display information to create stored additional display information; and
   d. a system component to simultaneously display said standard display information and said stored additional display information, said additional display information being derived at least in part from information encoded in at least one previous blanking interval not adjacent to the field or frame containing the currently displayed standard display information.

14. A process for modifying a television signal comprising the step of:
   encoding into at least one blanking interval of a first field of said television signal, supplemental information intended to be presented to a viewer, in association with, but not before the display of, a second, distinct, subsequent field of said television signal, wherein said supplemental information is additional resolution information.

15. A process for modifying a video signal comprising the step of:
   encoding into a portion unused for picture information of a first field or frame of said video signal, supplemental information comprising three-dimensional information intended to be presented to a viewer, in association with, but not before the display of, a second field or frame of said video signal.

16. A process as in claim 15 wherein said first field or frame and said second field or frame are one and the same.

17. A process as in claim 15 wherein said first field or frame and said second field or frame are distinct, and said second field or frame is subsequent to said first field or frame.

18. A process for modifying a video signal comprising the step of:
   encoding into a portion unused for picture information of a first field or frame of said video signal, supplemental information comprising image area map information intended to be presented to a viewer, in association with, but not before the display of, a second field or frame of said video signal.

19. A process as in claim 18 wherein said first field or frame and said second field or frame are one and the same.

20. A process as in claim 18 wherein said first field or frame and said second field or frame are distinct, said second field or frame is subsequent to said first field or frame.

21. A process for modifying a video signal comprising the step of:
   encoding into a portion unused for picture information of a first field or frame of said video signal, supplemental information comprising interactive information intended to be presented to a viewer, in association with, but not before the display of, a second field or frame of said video signal.

22. A process as in claim 21 wherein said first field or frame and said second field or frame are one and the same.

23. A process as in claim 21 wherein said first field or frame and said second field or frame are distinct, said second field or frame is subsequent to said first field or frame.

24. A process for modifying a video signal comprising the step of:
   encoding into a portion unused for picture information of a first field or frame of said video signal, supplemental information comprising Hypermedia information intended to be presented to a viewer, in association with, but not before the display of, a second field or frame of said video signal.

25. A process as in claim 24 wherein said first field or frame and said second field or frame are one and the same.

26. A process as in claim 24 wherein said first field or frame and said second field or frame are distinct, said second field or frame is subsequent to said first field or frame.

27. A process for modifying a video signal comprising the steps of:

a. encoding into at least one portion unused for picture information of a first frame of said video signal, supplemental image information associated with a second, distinct, subsequent frame of said video signal; and, b. utilizing said supplemental image information in association with said second, distinct, subsequent frame of said video signal.

28. A process as in claim 27 comprising in addition:

c. said supplemental image information is associated only with said second, distinct, subsequent frame; and, d. the step of processing said supplemental image information is performed between steps a. and b.

29. A process for modifying a video signal comprising the steps of:

a. encoding into at least one portion unused for picture information of a first frame of said video signal, supplemental image information associated with a second, distinct, subsequent, non-adjacent frame of said video signal; and, b. utilizing said supplemental image information in association with said second, distinct, subsequent, non-adjacent frame of said video signal.

30. A process as in claim 29 comprising in addition:

c. said supplemental image information is associated only with said second, distinct, subsequent, non-adjacent frame; and, d. the step of processing said supplemental image information for a period of at least one video frame time is performed between steps a. and b.

31. A process for modifying a video signal comprising the step of:

encoding into at least one portion unused for picture information of a first frame of said video signal, supplemental information intended to be presented to a viewer, in association with, but not before the display of, a second, distinct, subsequent frame of said video signal, wherein said video signal is of a particular width and at least some of said supplemental information comprises information utilized to make the displayed image wider.

32. A process for modifying a video signal comprising the step of:

encoding into at least one portion unused for picture information of a first frame of said video signal, supplemental information intended to be presented to a viewer, in association with, but not before the display of, a second, distinct, subsequent, non-adjacent frame of said video signal, wherein said video signal is of a particular width and at least some of said supplemental information comprises information utilized to make the displayed image wider.

33. A process for modifying a video signal comprising the step of:

encoding into at least one portion unused for picture information of a first frame of said video signal, supplemental information intended to be presented to a viewer, in association with, but not before the display of, a second, distinct, subsequent frame of said video signal, wherein said supplemental information is additional resolution information.

34. A process for modifying a video signal comprising the step of:

encoding into at least one portion unused for picture information of a first frame of said video signal, supplemental information intended to be presented to a viewer, in association with, but not before the display of, a second, distinct, subsequent, non-adjacent frame of said video signal, wherein said supplemental information is additional resolution information.

* * * * *